Inventor
EMIL HEMPEL

Aug. 19, 1941.  E. HEMPEL  2,253,460
INJECTION MOLDING MACHINE
Filed April 11, 1939  4 Sheets-Sheet 3

Inventor
EMIL HEMPEL
By
Attorney

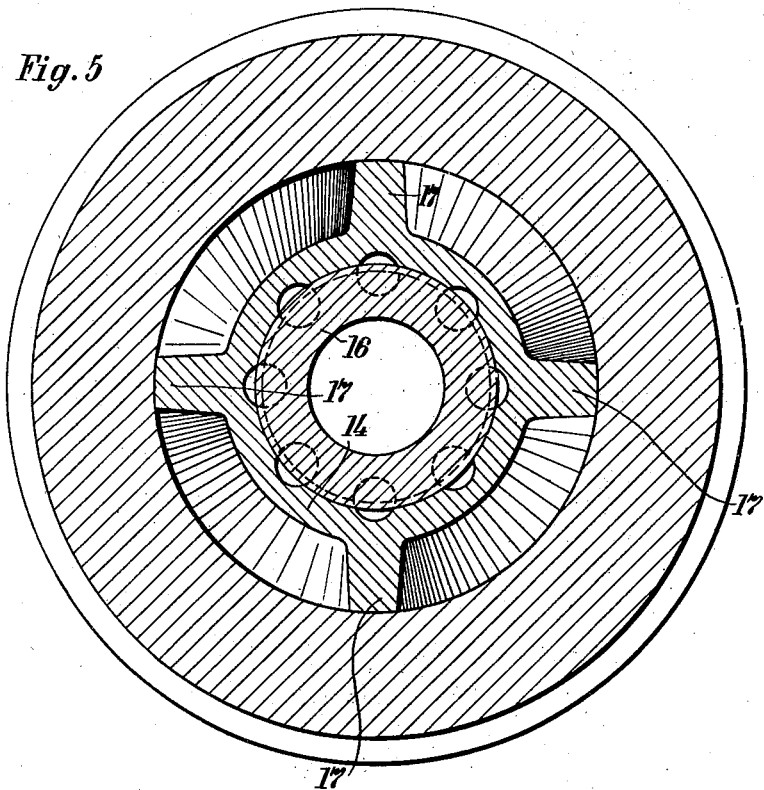
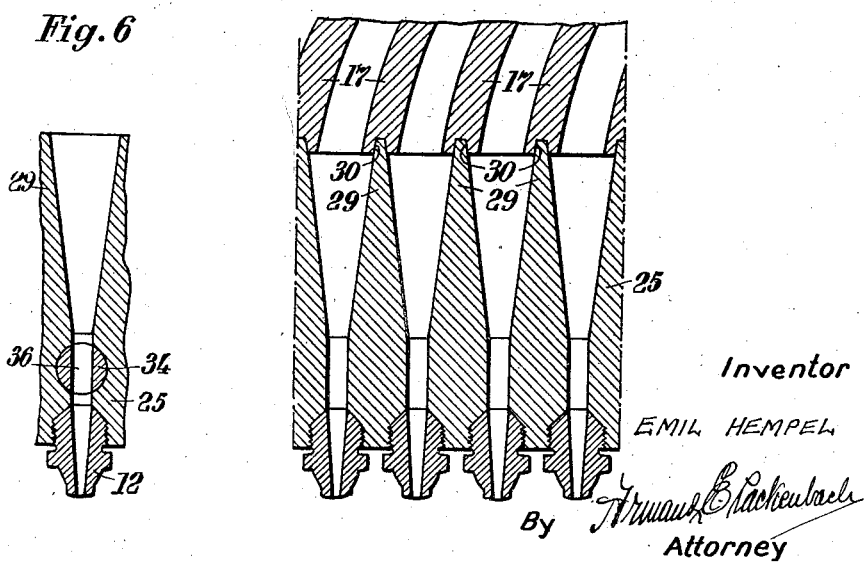

Patented Aug. 19, 1941

2,253,460

UNITED STATES PATENT OFFICE 2,253,460

INJECTION MOLDING MACHINE

Emil Hempel, Zerbst, Germany, assignor to Franz Braun A.-G., Zerbst, Germany

Application April 11, 1939, Serial No. 267,259
In Germany April 11, 1938

9 Claims. (Cl. 18—30)

My invention relates to an injection molding machine in which a thermoplastic material is heated and is injected into the mold in plastic condition.

The object of my invention is to improve and facilitate the operation of the machine; to improve the quality of the product obtained by the machine; to enhance the homogeneity of the thermoplastic material injected into the mold by the provision of improved heating and mixing means; and to facilitate the exchange of the injecting means.

Further objects of my invention will appear from the description following hereinafter and the features of novelty will be pointed out in the claims.

A preferred embodiment of my invention is shown in the accompanying drawings in which Fig. 1 is a longitudinal section through the injecting mechanism in which the thermoplastic material is heated preparatory to the injection into the mold, Fig. 2 is the section taken along line 2—2 of Fig. 1 representing a plan view of the mouth piece and of the mixing chambers provided therein;

Fig. 5 is the section taken along line 5—5 of Fig. 1;

Fig. 6 is a partial section taken along line 6—6 of Fig. 1 and

Fig. 7 is a developed section taken along the dotted circle shown in Fig. 2 through the nozzles and the mixing chambers.

Figure 1:
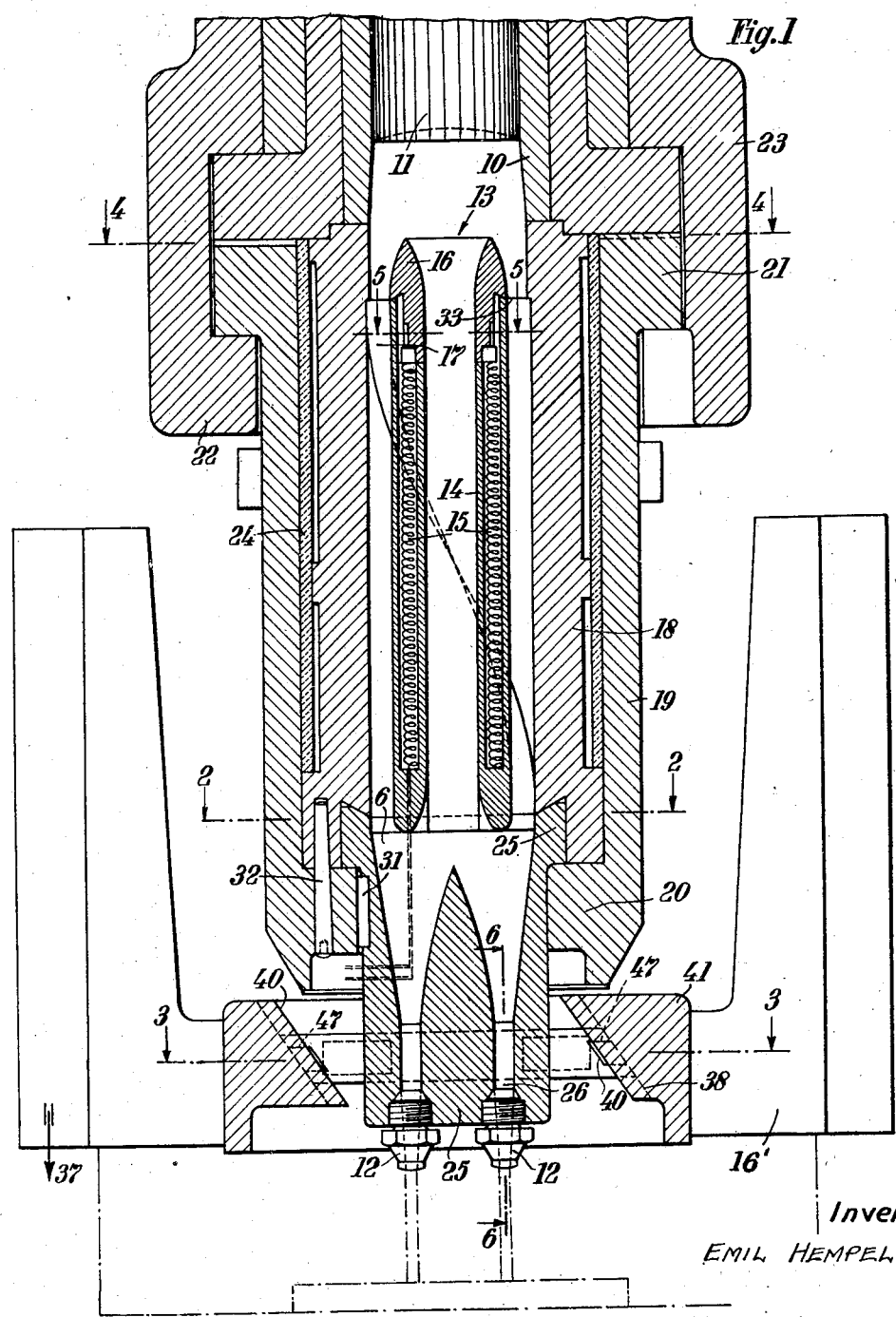

An injection molding machine of the type to which my invention relates is comprised of the following basic elements which cooperate as follows: A dosing device feeds a predetermined amount of granulated or pulverized thermoplastic material into the hopper of a cylinder press. The piston of this press is then operated, preferably by an electric motor, through a suitable motion-transmitting mechanism to force the thermoplastic material through an electrically heated conduit to a nozzle. The nozzle injects the plastic material into a water-cooled mold. After the material has set in the mold, the mold is opened and the finished work piece is ejected therefrom. Preferably, these operations are automatically controlled by suitable means, such as electrical circuits. In this way, the operation may be rendered fully automatic.

I have found that the quality of the product produced by machines of this type may be considerably improved by rendering the heated plastic material thoroughly homogeneous before it is injected into the mold. As the plasticity of the material varies greatly with the temperature, I attain an excellent homogeneity by the provision of heating and mixing means which will heat the entire material to be injected to the same temperature throughout. Prior to my invention it was common practice to cause the material to flow around a cylindrical heating body preparatory to the entry into the nozzle so as to produce a comparatively thin stream which surrounds the heating body and will rapidly take up the heat. Owing to the poor heat conductivity of thermoplastic materials, however, the homogeneity so obtained is not quite satisfactory, since the stream of material flows through the heating space within a comparatively brief period of time in which it will not assume a uniform temperature to the desired degree. It is a primary object of my invention to improve these conditions. To this end, I provide the heating body or heating cylinder, which is mounted in the conduit connecting the pressing cylinder with the nozzle, with helical ribs or the like which split up the stream of material in a plurality of helical streams. Owing to this arrangement each particle will move past the heating body along a helical path and will thus describe a longer path than would be the case with an axially directed stream of material. Thus, the particles will remain within the heating region for a longer interval whereby the heat will be more thoroughly distributed throughout the material and will raise the same to a more uniform temperature.

Moreover, I interpose a mixing chamber between the heating body and the nozzle or nozzles, this chamber being preferably formed by an exchangeable mouth piece. After the streams of material have moved past the heating body and have been heated therein, they will enter the mixing chamber or chambers and will be thoroughly agitated therein whereby the homogeneity is further enhanced.

When the machine is provided with a plurality of nozzles, I prefer to coordinate a plurality of mixing chambers individually to the nozzles each mixing chamber being operative to receive a ribbon-like strand of material and to roll the same together. In this manner, particles which have been in direct contact with the heating body and have thus been heated up to a higher temperature will be intermixed with particles which have moved within the stream or strand of material along a path located on the side remote from the heating body. Even if no satisfactory uniformity should have been reached within the stream or strand of material when the same leaves the region of the heating cylinder, the subsequent mixing operation whereby the strands are rolled upon themselves will produce a high degree of uniformity and homogeneity.

The partitions separating the mixing chambers may constitute continuations of the helical ribs of the heating body. Owing to this arrangement, the strands of material will enter the mixing chambers without meeting with any particular resistance which would require an undesirable increase in the injection pressure.

To further avoid an undue increase of the injection pressure, I prefer to provide the partitions separating the mixing chambers with acute edges extending towards the axis of the mouth piece, the edges being operative to subdivide the strand of material flowing through the hollow interior space of the heating body into a plurality of individual strands which will be mixed with the helical strands in the mixing chambers.

The injection pressure is further reduced by providing the nozzle valves with an electrical heating mechanism which prevents the material passing through the nozzles from cooling which would reduce its plasticity. The supply of heating energy to the nozzle valves involves the risk, however, that the material might be overheated. In order to eliminate this risk I provide suitable means which will cut off the heating energy automatically when the nozzles are closed. When the nozzle valves are opened, the heat supply is automatically started.

If work pieces of a material of a different color are to be produced, it is advisable to exchange the mouth piece and the conduit connecting it with the pressing cylinder. In order to facilitate this operation, a retaining cylindrical member is provided which surrounds the conduit with the heating cylinder and the mouth piece and serves to connect the same to the press. Preferably, I attach this retaining cylindrical member to the frame of the pressing cylinder by a plurality of interlocking projections which may be released from the press by a rotary motion and by subsequent axial displacement.

In Fig. 1 I have diagrammatically illustrated the press piston 11 which is movable within the cylinder 10 to feed the material towards the injection nozzles 12. On its way the material flows past the heating cylinder 13 partly through the longitudinal bore thereof and partly past its outer periphery.

The heating cylinder 13 is comprised of a tube 14 provided with a plurality of bores 15 extending within its wall parallel to its axis and accommodating helical heating elements. The mouths of the bores 15 positioned in the upper end of the tube 14 are covered by an annular member 16 which has outer threads engaging inner threads of the tube 14. The annular member 16 is provided with an acute upper edge.

I have provided the tube 14 with four helical ribs 17. These ribs serve to suitably align the heating cylinder 14 within the surrounding cylinder 18 which is a continuation of the cylinder 10 and is suitably secured thereto by a retaining cylindrical member 19.

Moreover, the helical ribs 17 serve the purpose of splitting up the stream of material flowing around the cylinder 14 into a plurality of helical strands thus imparting a rotary flow to the material whereby the same will be more uniformly heated than it would be possible if the material would flow axially past the heating cylinder.

The retaining cylindrical member 19 is provided with a lower flange 20 engaging over the cylinder 18. Its upper end is provided with three segmental projections 21 which engage over three internal projections 22 of the press frame 23. The projections 21 are so dimensioned that upon a rotary displacement of the retaining cylindrical member 19 they may be pulled downwardly passing through the spaces between the projections 22. The contacting surfaces of the projections 21 and 22 extend in a helical direction, whereby the retaining cylindrical member may be axially tightened by a rotary motion to positively press the cylinder 18 against the cylinder 10, whereby a sealed connection between the two cylinders will be established.

A heat-insulating layer 24 is interposed between the retaining cylindrical member 19 and the cylinder 18. Additional heating elements may be provided within the recesses of the cylinder 18.

The cylinder 18 is a conduit extending from the press cylinder 10 to the mouth piece 25. The mouth piece is provided with four nozzles 12 through which the heated plastic material is injected into the mold. The upper end of the mouth piece 25 is provided with a flange over which the flange 20 of the retaining cylindrical member engages, whereby the mouth piece will be tightly pressed against the cylinder 18.

The interior of the exchangeable mouth piece constitutes mixing chambers which are interposed between the nozzles 12 and the heating element 14. To this end, the four nozzle conduits 26 are upwardly tapered to constitute mixing chambers. The partitions separating these chambers have acute edges 27 extending up to the axis of the heating element, as will appear from Fig. 2. These acute edges will cut the strand of material issuing from the interior of the cylinder 14 into four individual strands and will guide these strands into the mixing chambers.

Figure 2:
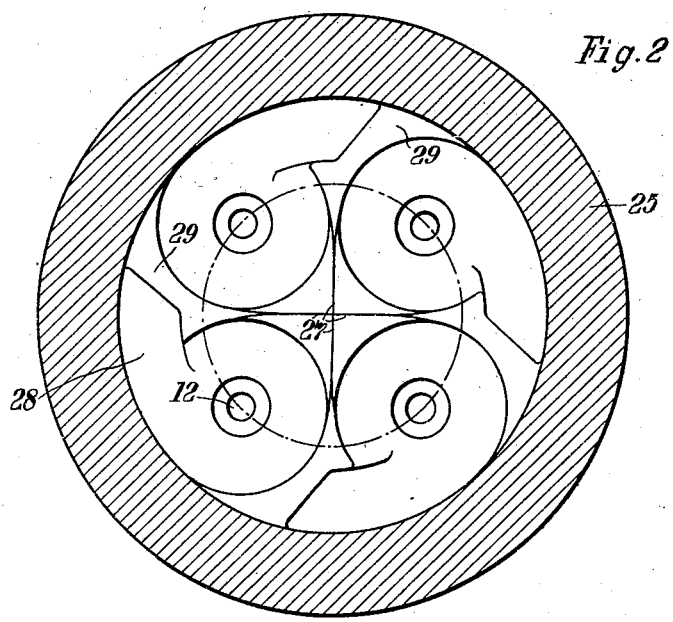

Moreover, each tapered mixing chamber is operative to receive the ribbon-like strand of material issuing from between the outer periphery of the cylinder 14 and the helical ribs thereof and to turn the same upon itself. To this end, each of the tapered chambers is enlarged near the outer wall of the mouth piece 25 to form an inclined shaft 28, as shown in Fig. 2. When the ribbon-like strand of material enters this shaft and flows downwardly in the same, it is urged by the inclined wall of the shaft 28 into the conical lower part of the tapering chamber and is turned therein upon itself. In this operation the ribbon-like strand of material is thoroughly mixed with the strand cut by the edges 27 from that issuing from the interior of the cylinder 14.

In Fig. 7 I have illustrated a development of the section taken along the dotted circle shown in Fig. 2. This figure shows that the partitions separating the tapering chambers constitute continuations of the helical ribs 17 of the heating body 14. Moreover, it will appear that the heating cylinder 14 extends into the mouth piece 25 a short distance, about .2 inch, and is provided at its lower end with radial notches 30 engaging over the partitions 29. In this manner, the heating cylinder is secured by the mouth piece against rotation and is thus held from being turned by the reactionary torque exerted upon it by the material pressed therethrough along a helical path. The mouth piece 25 is secured against rotation relative to the retaining cylindrical member 19 by a key 31 and the cylinder 18 is secured against rotation to the retaining cylindrical member 19 by a removable pin 32. The helical ribs 17 are sharpened at their upper edges 33. Their lower edges abut bluntly against the flat faces of the partitions 29.

In the absence of special precautions the strands of material would cool when passing through the nozzle conduits and their plasticity would be thereby reduced which would require an increased injection pressure. As, however, a higher resistance must be overcome anyhow owing to the helical guidance of the strands of material and owing to their guidance in the mixing chambers, any additional increase of the resistance by a cooling of the strands in the nozzles should be avoided. For this reason, I have provided means for maintaining the temperature of the strands of material flowing through the nozzle conduits. The heating elements serving this purpose are preferably arranged within cylindrical slide valves 34 (Fig. 6) which are slidably guided in two cylindrical transverse bores 35 of the mouth piece 25. Each of the slide valves 34 has a transverse bore 36. When these bores 36 are in registry with the nozzle conduit 26, the material may be freely fed to the nozzles 12. The conduit 26 will be closed, however, by lateral displacement of the slide valves 34 from this position. For the purpose of this lateral displacement the slides 34 are suitably connected with the slide carrying the mold. The mold slide adjacent to the heating cylinder is indicated at 16'. When the mold is opened, the slide moves in a direction parallel to the axis of the heating cylinder indicated by the arrow 37 under the action either of its own weight or of a suitable spring. In the embodiment shown the connection between this slide 16' and the valves 34 is established by the provision of the slide valves 34 with inclined end faces engaging slanting faces 38 of the slide 16', as shown in Fig. 1. These slanting faces constitute the bottom of grooves 39 (Fig. 3) which are provided within the inclined internal faces 40 of an annular member 41 which is attached to the mold slide 16' surrounding the lower portion of the mouth piece 25. In order to secure the slide valves 34 against rotary displacement within the bores 35, its ends extending into the grooves 39 have flat lateral faces.

When the form slide assumes the position shown in Fig. 1, the nozzle conduits 26 are open. When the form slide 16 moves from this position in the direction of the arrow 37, however, the slide valves 34 are displaced towards the left with reference to Fig. 1, whereby the conduits will be closed.

Figure 3:
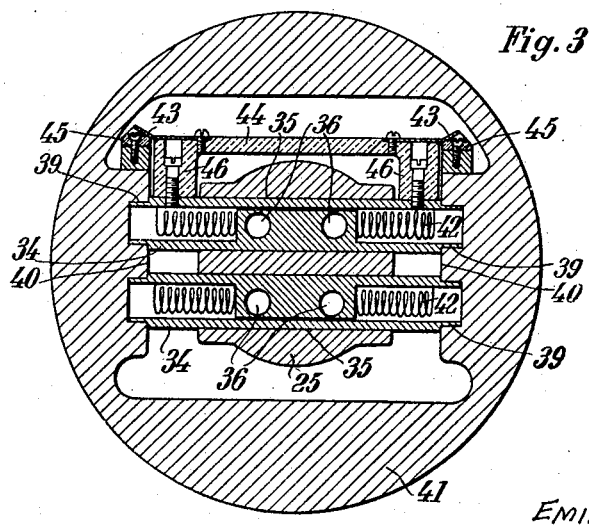
Fig. 3 is the section taken along line 3—3 of Fig. 1 illustrating the valve mechanism of the mouth piece with means for automatically supplying or interrupting heating current for the slide valves.
Figure 4:
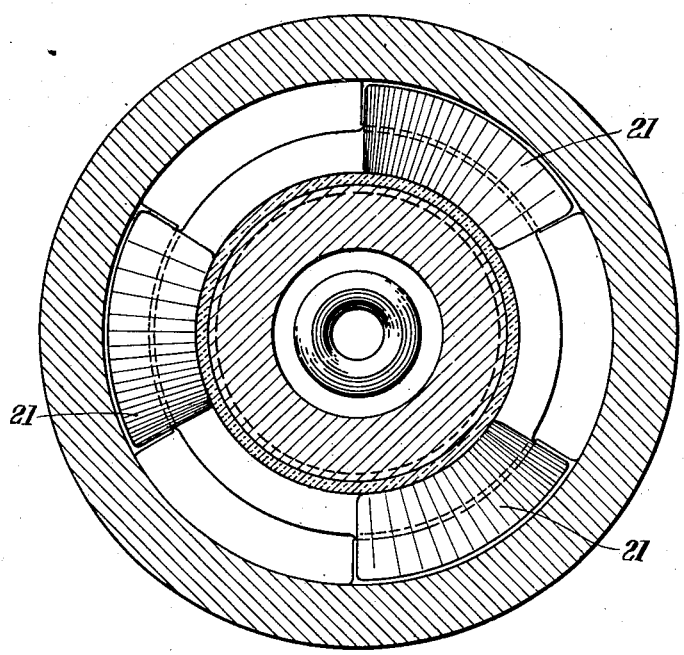
Fig. 4 is the section taken along line 4—4 of Fig. 1 representing a locking mechanism for the attachment of a holding cylinder.

The ends of the slide valves 34 extending laterally from the bores 36 are hollow and accommodate electrical heating elements 42, the terminals of which are formed by contact springs 43. These contact springs are mounted on a yoke 44 of insulating material which is laterally attached to one of the slide valves 34 by suitable screws, as shown in Fig. 3. The contact springs slide on bars 45 of insulating material extending parallel to the slanting internal faces 40 of the annular member 41. Within these bars 45 contact members 47 are inserted (Fig. 1) which are connected with a suitable source of current. When the form slide 16' assumes the position of Fig. 1, the springs 43 will contact with these members 47 and will supply heating energy to the elements 42. When the form slide moves in the direction of the arrow 37, however, the contact springs 43 will slide off from the members 47, whereby the heating circuit is interrupted. The arms 46 of the yoke 44 are so profiled that their inner faces extend vertically parallel to the side faces of the mouth piece 25 while their outer faces are oblique extending parallel to the faces 40.

By supplying current to the heating element 42 the temperature and plasticity of the material passing through the nozzles is maintained at the state reached on the passage of the material through the heating conduit 18.

An overheating of the material is prevented by the automatic interruption of the heating circuit upon termination of the injecting operation. When the machine has been out of operation for some time and is started again, the material in the bores 36 which have then become hard will be readily plasticized. The heat will be also transmitted to the mouth piece and will facilitate the passage of the material through the mixing chambers thereof.

While I have described my invention by reference to a specific embodiment thereof, it should be clearly understood that it is capable of numerous modifications which will readily occur to anyone skilled in the art.

What I claim is:

1. In an injection molding machine the combination comprising at least one nozzle adapted to cooperate with a mold, a press, a conduit leading from said press to said nozzle to feed thermoplastic material thereto, a heating cylinder removably mounted within said conduit, said cylinder being provided with integral helical ribs adapted to subdivide the stream of material into a plurality of helical streams.

2. In an injection molding machine the combination comprising at least one nozzle adapted to cooperate with a mold, a press, a conduit leading from said press to said nozzle to feed thermoplastic material thereto, a heating cylinder removably mounted within said conduit spaced from said nozzle, the end of the conduit adjacent to said nozzle constituting a mixing chamber, and helical partitions integral with said cylinder and arranged within the space between the walls of said conduit and said heating cylinder and adapted to subdivide the stream of material into a plurality of helical streams which are intermixed in said mixing chamber before being extruded through said nozzle.

3. In an injection molding machine the combination comprising a plurality of nozzles adapted to cooperate with a mold, a press, a cylindrical conduit leading from said press to said nozzles to feed thermoplastic material thereto, a hollow heating cylinder coaxially arranged within said conduit spaced from the walls of said conduit and partitions within the annular space between the walls of said conduit and said heating cylinder and adapted to subdivide the material passing through said annular space into a plurality of streams, a plurality of tapered mixing chambers each being interposed between one of said nozzles and said annular space, said tapered mixing chambers having a conical wall, and each being enlarged at the mouth thereof to form an inclined shaft extending tangentially from the conical wall, the lower portion of said shaft tapering towards the conical wall and being continuous therewith, whereby one of said streams and part of the material passing through said hollow heating cylinder are wound up spirally before being conducted into the corresponding nozzle.

4. In an injection molding machine the combination comprising a pressing cylinder, a cylindrical conduit communicating therewith, a mouth piece attached to said conduit and forming a plurality of tapering mixing chambers distributed about and parallel to the axis of said conduit and communicating therewith, partitions separating said mixing chambers and having acute edges extending towards and up to said axis, a plurality of nozzles carried by said mouth piece each communicating with one of said mixing chambers, a hollow heating cylinder coaxially arranged within said conduit and provided with exterior helical ribs, said heating cylinder subdividing the material flowing through said conduit into an inner central stream and into a plurality of outer helical streams, each mixing chamber receiving and mixing one of said helical streams and part of said central stream.

5. In an injection molding machine the combination comprising a mouth piece, a press adapted to feed thermoplastic material to said mouth piece to eject it therethrough into a mold, a conduit provided with heating means interposed between said press and said mouth piece and a retaining cylindrical member encircling said mouth piece and said conduit and provided with means engaging the mouth piece and the conduit to maintain these members in abutment and the conduit in abutment with the press, for readily releasable attachment to said press, said means including a plurality of interlocking projections adapted to be released from said press by a rotary motion and by a subsequent axial displacement.

6. In an injection molding machine the combination comprising a mouth piece provided with at least one ejection conduit, a press adapted to feed a thermoplastic material to said mouth piece and to eject it through said conduit, a mold adapted to receive the material ejected therefrom, and capable of movement towards and away from said mouth piece, a slidable valve mounted in said mouth piece and adapted to close said conduit, means responsive to said movement and operative to close said valve, when said mold moves away from said mouth piece, electrical heating means mounted to heat the seating surfaces of said valve, and contacts operable by movement of said valve to supply current to said heating means, when said valve is in opened condition.

7. In an injection molding machine the combination comprising a mouth piece provided with an ejection conduit, a valve member slidably mounted within said mouth piece and adapted to open and close said conduit, and electrical heating means encased within said valve member.

8. In an injection molding machine the combination comprising a mouth piece provided with an ejection conduit, a valve member slidably mounted within said mouth piece and adapted to open and close said conduit, electrical heating means encased within said valve member, and means operable by movement of said valve member and adapted to control said heating means.

9. In an injection molding machine for thermoplastic materials, the combination comprising a mouth piece provided with at least one ejection conduit, a valve mounted in said mouth piece and adapted to open or close said conduit, electrical heating means mounted to heat the seating surfaces of said valve, contacts controlling said electrical heating means and a member connected with said valve for common movement therewith and actuating said contacts.

EMIL HEMPEL.